(12) United States Patent
Warsaw et al.

(10) Patent No.: US 8,874,097 B1
(45) Date of Patent: Oct. 28, 2014

(54) SYSTEMS AND METHODS FOR RAPID AVAILABILITY OF CRITICAL FUNCTIONALITIES ON DEVICES USING CELLULAR OPERATING SYSTEMS

(71) Applicant: Harris Corporation, Melbourne, FL (US)

(72) Inventors: Thomas Warsaw, West Henrietta, NY (US); Bryce Tennant, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 5 days.

(21) Appl. No.: 13/938,605

(22) Filed: Jul. 10, 2013

(51) Int. Cl.
*H04M 3/00* (2006.01)
*H04W 76/02* (2009.01)

(52) U.S. Cl.
CPC ..................... *H04W 76/02* (2013.01)
USPC .......................................................... 455/418

(58) Field of Classification Search
USPC .......................................................... 455/418
See application file for complete search history.

(56) References Cited

U.S. PATENT DOCUMENTS

| 5,867,290 | A | 2/1999 | Dutt et al. |
| 6,731,878 | B1 | 5/2004 | Britz et al. |
| 7,127,669 | B2 | 10/2006 | Platenberg et al. |
| 7,277,644 | B2 | 10/2007 | Johnson et al. |
| 2013/0111556 | A1* | 5/2013 | Matsimanis et al. ............ 726/4 |

* cited by examiner

*Primary Examiner* — Joel Ajayi
(74) *Attorney, Agent, or Firm* — Fox Rothschild LLP; Robert J. Sacco, Esq.

(57) ABSTRACT

Systems (100) and methods (400) for operating a hybrid communication device (106). The methods involve executing at least one boot program. Responsive to the boot program, a first and second code are concurrently executed. The first code is operative for booting at least a real-time operating system on which a radio processor of the hybrid communication device is built. The second code is operative for booting at least a mobile operating system on which a cellular processor of the hybrid communication device is built. The radio processor provides support for wireless radio communication while the mobile operating system is booting.

20 Claims, 9 Drawing Sheets

_US 8,874,097 B1_

SYSTEMS AND METHODS FOR RAPID AVAILABILITY OF CRITICAL FUNCTIONALITIES ON DEVICES USING CELLULAR OPERATING SYSTEMS

STATEMENT OF THE TECHNICAL FIELD

The inventive arrangements relate to systems and methods for rapid availability of certain functionalities on devices using cellular operating systems. More particularly, the inventive arrangements concern hybrid communications equipment in which certain functionalities (e.g., Land Mobile Radio ("LMR") functionalities) are made available while a mobile operating system boots, and in which a subsequent hand over of control of these functionalities is made to the mobile operating system.

DESCRIPTION OF THE RELATED ART

LMR devices may be used to provide communication between different mobile units. LMR communication, for example, public safety radio communication (e.g., police, fire department, etc.) is generally available within the VHF, UHF, 700 MHz and 800 MHz frequency bands. Part of each of these frequency bands is allocated by the Federal Communications Commission ("FCC") for public safety communication services and are also referred to as Public Safety Frequency Bands ("PSFBs"). These communications also may be provided using private LMR Services ("PLMRS").

When LMRs are used, for example, to provide emergency communications, interoperability between different systems (e.g., a fire department LMR system and a police department LMR system, or different fire department LMR systems) is important. However, each of the different systems may have different communication requirements based on, for example, the manufacturer of the LMR or LMR system and/or the air interface protocol implemented on the system (e.g., trunked or conventional, M/A-COM or Motorola, P25, Enhanced Digital Access Communications System ("EDACS"), OPENSKY® or Terrestrial Trunked Mobile Radio ("TETRA")). Each of these different systems typically include a specific voice encoder ("vocoder") and have different encryption schemes. For example, a P25 system typically uses an Improved Multi-Band Excitation ("IMBE") vocoder with Data Encryption Standard ("DES") or Advanced Encryption Standard ("AES") encryption while an OPENSKY® system typically uses an Advanced Multi-Band Excitation ("AMBE®") vocoder with AES encryption. Various techniques have been implemented for allowing these different systems to inter-operate.

Public safety customers expect LMR devices to have a high availability, which they equate with: providing full on-air radio functionality within three seconds of booting or re-booting; and providing reliable operations (i.e., never experiencing a system crash). However, LMR devices do not provide the same functionalities as that of a Smartphone.

A Smartphone typically employs a mobile operating system, such as Google's Android. The mobile operating system provides rich functionalities that are desirable in a broadband device. For example, the mobile operating system provides a map functionality, a calendar functionality, an electronic mail functionality, and a web browser functionality. But, the mobile operating system lacks some characteristics needed to match the high availability performance existing in LMR devices. This drawback of mobile operating system results from: the relatively long time required to boot (e.g., greater than or equal to 15 seconds); and the relatively high risk of a system crash.

Notably, there is no push-to-talk device using a cell phone operating system that is currently being sold as a mission critical solution for public safety users. Therefore, there is a need for such a communication device. This communication device should have the high availability performance of existing LMR devices and the rich functionalities of existing cellular devices.

SUMMARY OF THE INVENTION

The present invention concerns systems and methods for operating a hybrid communication device. The methods involve executing at least one boot program. In response to the boot program, a first code and a second code are concurrently executed. The first code is configured for booting at least a real-time operating system on which a radio processor of the hybrid communication device is built. The second code is configured for booting at least a mobile operating system on which a cellular processor of the hybrid communication device is built. The radio processor provides support for wireless radio communication functionalities while the mobile operating system is booting. In this regard, the radio processor controls a first portion of a plurality of input and output devices of the hybrid communication device that are necessary for providing the wireless radio communication functionalities, while the mobile operating system is booting.

The methods also involve executing a third code after the mobile operating system has fully booted. The third code is configured for: (a) transferring control of the first portion of the input and output devices from the radio processor to the cellular processor; and/or (b) transferring control of the wireless radio communication functionalities from the radio processor to the cellular processor. In some scenarios, the process for transferring such control involves: performing operations by the cellular processor to notify the radio processor that it is ready to accept control of the wireless radio communication functionalities; and performing operations by the radio processor to determine when to transfer control of the wireless radio communication functionalities to the cellular processor based on a pre-defined criteria. The pre-defined criteria can include, but is not limited to, an operating state of the radio processor and a current activity of the radio processor.

After such control has been transferred, the cellular processor acts as a master processor, while the radio processor acts as a slave processor. As the slave processor, the radio processor monitors activities of the cellular processor to detect a system crash. If a system crash is detected, then the radio processor performs operations to: (a) re-take control of the wireless radio communication functionalities; and/or (b) reset the cellular processor so as to bring it to an initial state.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
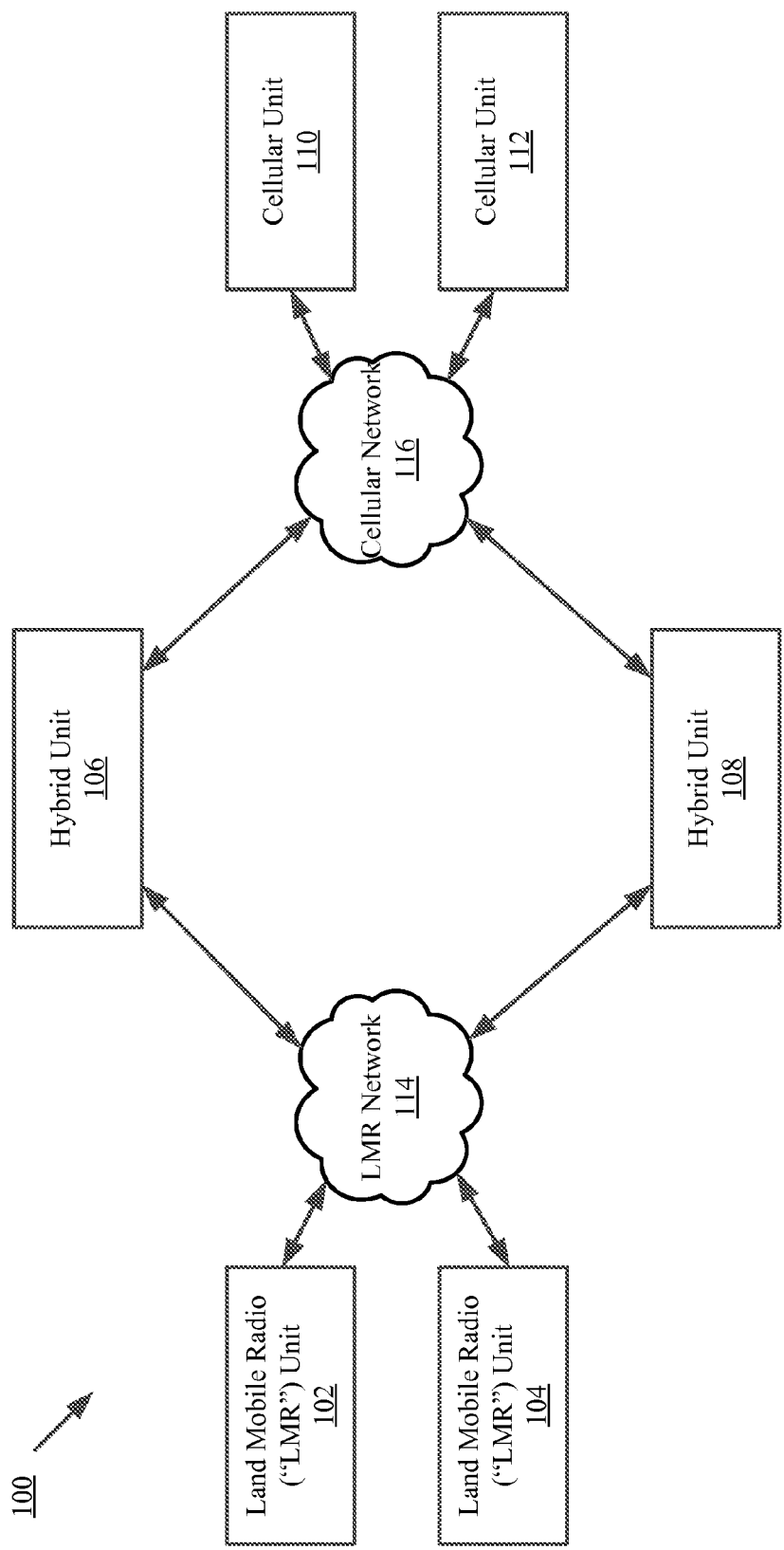
FIG. 1 is a schematic illustration of an exemplary communication system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-13C. Embodiments generally relate to communication devices employing real-time operating systems and cellular operating systems. A person can appreciate the need in a public safety and/or military context of being able to use a communication device almost instantaneously in emergency situations. For example, in a time-critical situation, such as when a group of public safety personnel (e.g., police officers) and/or armed forces comes under attack, the need to be able to relay information between other members of the public safety personnel and/or armed forces as quickly as possible is absolutely necessary. Accordingly, the systems of the present invention implement a boot process which takes a relatively short amount of time to power up at least a portion thereof where it is able to perform critical or emergency communications. The systems also implement a software routine which ensures that critical or emergency communications can be performed even when the communication device experiences a system crash.

Referring now to FIG. 1, there is provided a schematic illustration of an exemplary communication system 100 that is useful for understanding the present invention. The system 100 comprises a plurality of LMR units 102, 104, hybrid units 106, 108, and cellular units 110, 112. LMR units and cellular units are well known in the art, and therefore will not be described herein. Still, it should be understood that communications between the LMR units 102, 104 are provided via an LMR network 114. The LMR network 114 can include, but is not limited to, a P25 network, a TETRA network, an OPENSKY network, am EDACS network, and a Long Term Evolution ("LTE") network. Communications between the cellular units 110, 112 are via a cellular network 116.

The hybrid units 106, 108 are generally configured to communicate with LMR units via the LMR network 114 and cellular units 110, 112 via the cellular network 116. The hybrid units 106, 108 can also communicate with each other via the LMR network 114 and/or the cellular network 116. In this regard, the hybrid units 106, 108 have functionalities supported by a real-time operating system and a mobile operating system, as will be described in more detail below. The mobile operating system can include, but is not limited to, Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. A more detailed schematic illustration of a hybrid unit is provided in FIG. 2.

Figure 2:
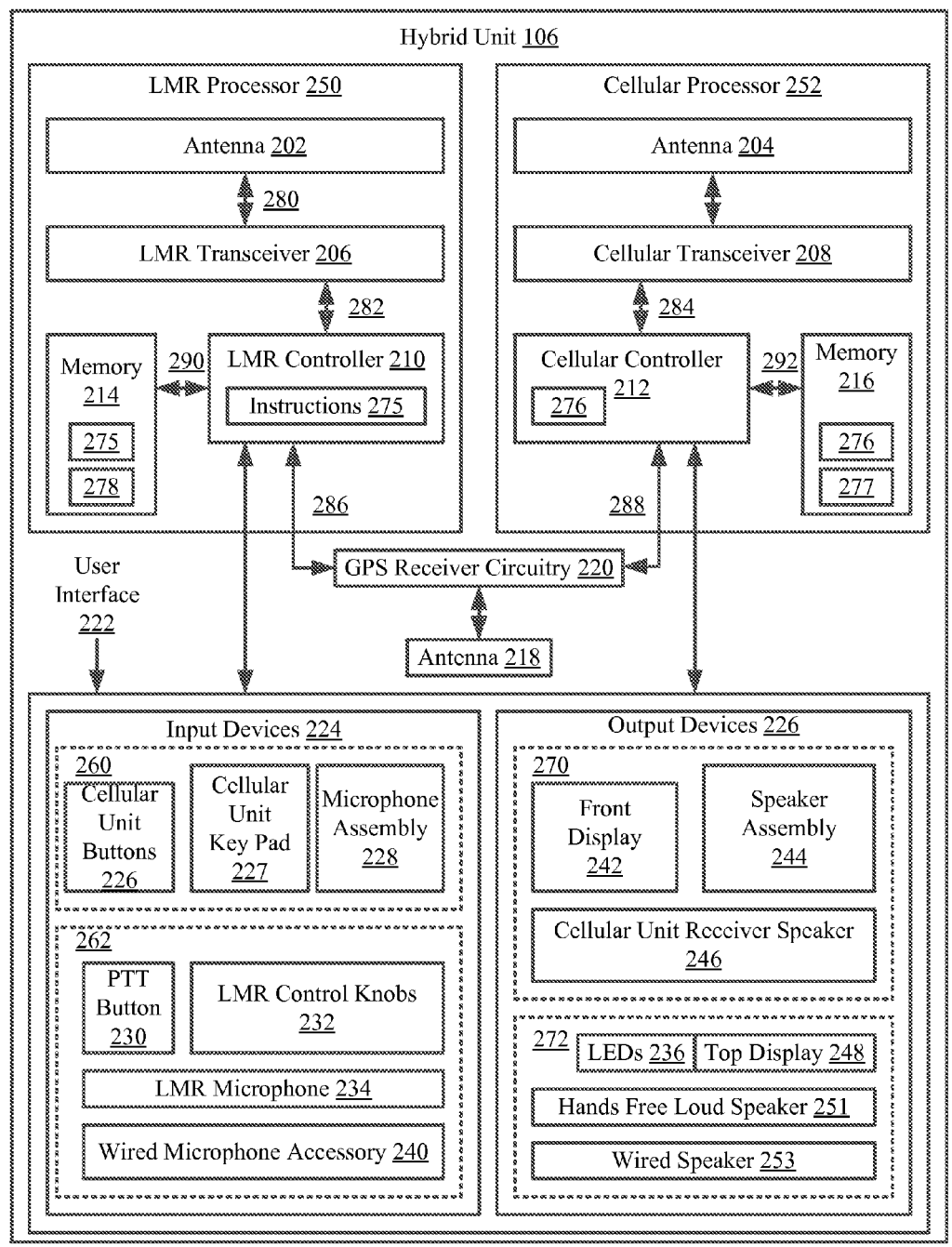
FIG. 2 is a schematic illustration of an exemplary architecture for a hybrid unit shown in FIG. 1.

Referring now to FIG. 2, a schematic illustration of an exemplary architecture for the hybrid unit 106 of FIG. 1 is provided. Hybrid unit 108 of FIG. 1 is the same as or similar to hybrid unit 106. As such, the following discussion of hybrid unit 106 is sufficient for understanding hybrid unit 108 of FIG. 1. Hybrid unit 106 may include more or less components than those shown in FIG. 2. However, the components shown are sufficient to disclose an illustrative embodiment implementing the present invention. In this regard, hybrid unit 106 implements methods for providing the high availability performance of existing LMR devices and the rich functionalities of existing cellular devices. Exemplary embodiments of such methods will be described below in relation to FIGS. 4-10. Some or all of the components of the hybrid unit 106 can be implemented in hardware, software and/or a combination of hardware and software. The hardware includes, but is not limited to, one or more electronic circuits.

As shown in FIG. 2, hybrid unit 106 comprises an LMR processor 250 and a cellular processor 252. Embodiments of the present invention are not limited in this regard. For example, hybrid unit 106 can alternatively include a single processor with multiple cores running two different operating systems, such as a real-time operating system and a cellular operating system side by side.

The LMR processor 250 is built on a real-time operating system, and is generally configured to provide LMR communication functionalities. The LMR communication functionalities can include, but are not limited to, a Push-To-Talk ("PTT") functionality, a radio communication functionality, a radio channel control functionality, a waveform control functionality, a volume control functionality, a top display control functionality, an auditory output functionality, a visual output functionality, a talkgroup selection functionality, a destination device selection functionality, location tracking and reporting functionalities, and map or navigation functionalities. The listed LMR processor functionalities are well known in the art, and therefore will not be described in detail herein.

The cellular processor 252 is built on a mobile operating system. The mobile operating system includes, but is not limited to, Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. The cellular processor 252 is also generally configured to provide cellular communication functionalities, personal digital assistant functionalities, portable media player functionalities, digital camera functionalities, video camera functionalities, location tracking functionalities, web browser functionalities, and touch screen functionalities. The cellular communication functionalities include, but are not limited to, a signal transmit/receive functionality, a volume control functionality, a front display control functionality, a button control functionality, and a speaker/microphone control functionality. The personal digital assistant functionalities include, but are not limited to, a map functionality, a calendar functionality, and an electronic mail functionality. The listed cellular processor functionalities are well known in the art, and therefore will not be described in detail herein.

Accordingly, each processor 250, 252 includes hardware and/or software components for facilitating the LMR or cellular communications. As shown in FIG. 2, this hardware includes an antenna 202, 204, a transceiver 206, 208, a controller 210, 212, and memory 214, 216. The antenna 202, 204 is provided for receiving and transmitting signals communicated via a respective one of an LMR network (e.g., LMR network 114 of FIG. 1) and a cellular network (e.g., cellular network 116 of FIG. 1). The transceiver 206, 208 may include a receive/transmit ("Rx/Tx") switch (not shown). In such scenarios, the Rx/Tx switch selectively couples the respective antenna 202, 204 to transmitter circuitry (not shown) and receiver circuitry (not shown) of the transceiver 206, 208 in a manner familiar to those skilled in the art.

During operation, the receiver circuitry (not shown) demodulates and decodes the signals received from a network (e.g., the network 114 or 116 of FIG. 1) to derive information therefrom. The receiver circuitry (not shown) is coupled to a controller 210, 212 via an electrical connection 280. The receiver circuitry (not shown) provides the decoded signal information to the controller 210, 212. The controller 210, 212 uses the decoded signal information in accordance with the function(s) of the hybrid unit 106. For example, if the signals include identifier information and/or location information for other communication devices (e.g., devices 102, 104, 108, 110, 112 of FIG. 1), then the identifier and/or location information can be used by the controller 210, 212 to identify other devices that are pre-defined distances from or within range of the hybrid unit 106. The controller 210, 212 also provides information to the transmitter circuitry (not shown) of the transceiver 206, 208 for encoding and modulating information into transmit signals. Accordingly, the controller 210, 212 is coupled to the respective transmitter circuitry (not shown) via electrical connection 282, 284. The transmitter circuitry (not shown) communicates the transmit signals to the antenna 202, 204 for transmission to an external device (e.g., network equipment of network 114, 116 of FIG. 1).

An antenna 218 is coupled to GPS receiver circuitry 220 for receiving GPS signals. The GPS receiver circuitry 220 demodulates and decodes the GPS signals to extract GPS location information therefrom. The GPS location information indicates the location of the hybrid unit 106. The GPS receiver circuitry 220 provides the decoded GPS location information to one or both controllers 210, 212. As such, the GPS receiver circuitry 220 is coupled to the controller 210 via electrical connection 286 and controller 212 via electrical connection 288. Notably, the present invention is not limited to GPS based methods for determining a location of hybrid unit 106. Other methods for determining a location of a communication device can be used with the present invention without limitation.

The controllers 210, 212 use the decoded GPS location information in accordance with the function(s) of the hybrid unit 106. For example, the GPS location information and/or other location information can be used to generate a geographic map showing the location of the hybrid unit 106. The GPS location information and/or other location information can also be used to determine the actual or approximate distance between the hybrid unit 106 and other communication devices (e.g., devices 102, 104, 108, 110, 112 of FIG. 1).

The controllers 210, 212 store the decoded receive signal information and the decoded GPS location information in a respective memory 214, 216. Accordingly, the memory 214, 216 is connected to and accessible by the respective controller 210, 212 through an electrical connection 290, 292. The memory 214, 216 can be a volatile memory and/or a non-volatile memory. For example, the memory 214, 216 can include, but is not limited to, a Random Access Memory ("RAM"), a Dynamic Random Access Memory ("DRAM"), a Static Random Access Memory ("SRAM"), a Read-Only Memory ("ROM"), and a flash memory. The memory 214, 216 can also have stored therein software applications 278, 277.

The software applications 278 include, but are not limited to, applications operative to provide LMR communication services, PTT services, emergency communication services, GPS based services, map or navigation services, location tracking services, position reporting services, and cryptographic services. The software applications 277 include, but are not limited to, applications operative to provide telephone services, network communication services, GPS based services, map or navigation services, location tracking services, position reporting services, commerce services, email services, web based services, and/or electronic calendar services. The software applications 277, 278 are also operative to determine the positions of other devices and/or determine the location of the hybrid unit 106 relative to the other devices and/or landmarks (e.g., an intersection or a site of historical significance).

As shown in FIG. 2, one or more sets of instructions 275 are stored in the memory 214 of the LMR processor 250. Similarly, one or more sets of instructions 276 are stored in the memory 216 of the cellular processor 252. The instructions 275, 276 can also reside, completely or at least partially, within the respective controller 210, 212 during execution thereof by the hybrid unit 106. In this regard, the memories 214, 216 and the controllers 210, 212 can collectively or respectively constitute machine-readable media. The term "machine-readable media", as used here, refers to a single medium or multiple media that store the one or more sets of instructions 275, 276. The term "machine-readable media", as used here, also refers to any medium that is capable of storing, encoding or carrying the set of instructions 275, 276 for execution by the hybrid unit 106 and that cause the hybrid unit 106 to perform one or more of the methodologies of the present disclosure.

Each of the controllers 210, 212 is also connected to a user interface 222. The user interface 222 is comprised of input devices 224, output devices 226, and software routines (not shown in FIG. 2) configured to allow a user to interact with and control software applications 277, 278 installed on the hybrid unit 106. The input devices 224 include first stage input devices 262 and second stage input devices 260. The first stage input devices include those input devices which are necessary to provide critical or emergency communications as quickly as possible after power up of the hybrid unit 106 or a re-boot of the cellular processor 252 thereof. Such input devices include, but are not limited to, a PTT button 230, LMR control knobs 232, an LMR microphone 234, and a wired microphone accessory 240. The second stage input devices 260 include, but are not limited to, cellular unit buttons 226, a cellular unit key pad 227, and a microphone assembly 228. The microphone assembly 228 can include, but is not limited to, a Near Field Communication ("NFC") microphone assembly and/or a Bluetooth microphone assembly. Each of the listed input devices is well known in the art, and therefore will not be described herein. Notably, in some scenarios, the microphone assembly 228 (e.g., the Bluetooth microphone assembly) is a first stage input device 262, rather than a second stage input device 260.

Similarly, the output devices 226 include first stage output devices 272 and second stage output devices 270. The first stage output devices 272 include those output devices which are necessary to provide critical or emergency communications as quickly as possible after power up of the hybrid unit 106 or a re-boot of the cellular processor 252 thereof. Such output devices include, but are not limited to, Light Emitting Diodes ("LEDs") 236, a top display 248, a hands free loud speaker 251, and a wired speaker 253. The second stage output devices 270 include, but are not limited to, a front display 242, a speaker assembly 244, and a cellular unit receiver speaker 246. The speaker assembly 244 can include, but is not limited to, a Near Field Communication ("NFC") speaker assembly and/or a Bluetooth speaker assembly. Each of the listed output devices is well known in the art, and therefore will not be described herein. Notably, in some scenarios, the speaker assembly 244 (e.g., the Bluetooth speaker assembly) is a first stage output device 272, rather than a second stage output device 270.

Figure 3:
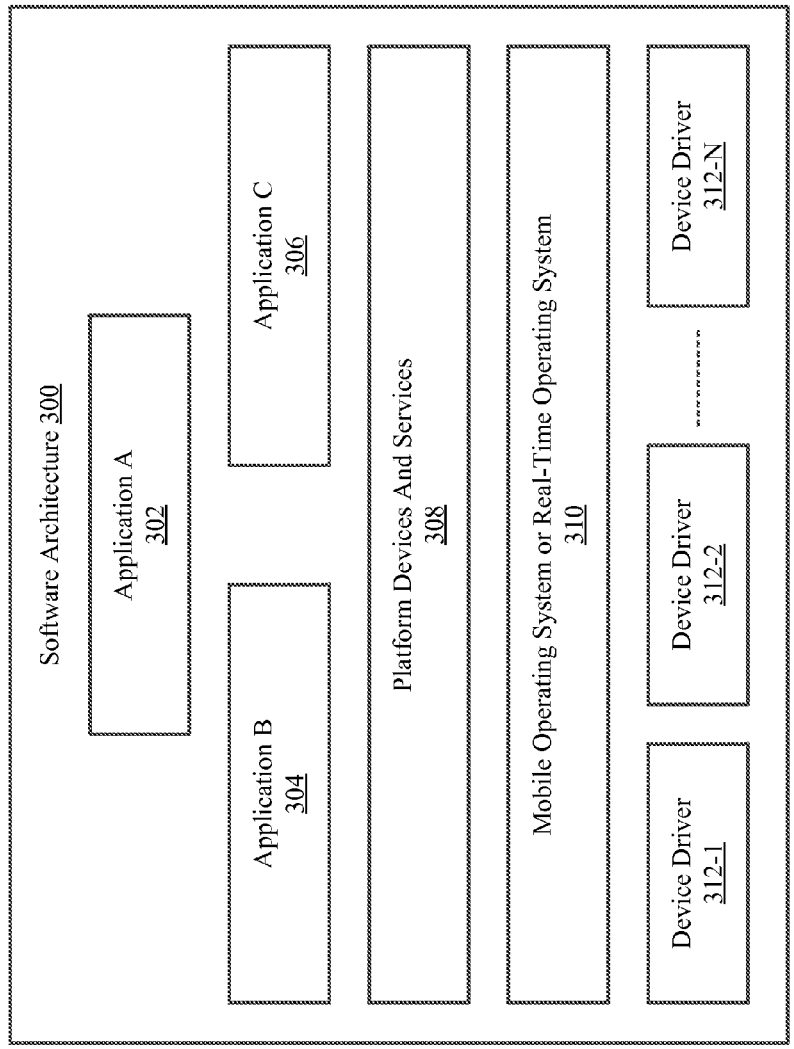
FIG. 3 is a schematic illustration of an exemplary software architecture for a communication device that is useful for understanding the present invention.

Referring now to FIG. 3, there is provided a schematic illustration of an exemplary software architecture 300 employed by the LMR processor 250 and the cellular processor 252 of FIG. 2. The software architecture 300 can include levels of software programs. As shown in FIG. 3, the software architecture 300 includes device driver software programs 312-1, 312-2, ..., 312-N, an operating system 310, platform devices and services software programs 308, and software applications 302, 304, 306. The software programs of the architecture 300 are well known to persons skilled in the art. Thus, the software programs will only be briefly described herein.

A device driver program 312-1, 312-2, ..., 312-N is software the hybrid unit 106 uses to facilitate communications between hardware components. A device driver program 312-1, 312-2, ..., 312-N can include code for managing access to hardware components, taking hardware components in and out of services (i.e., allocation or de-allocate), setting hardware component parameters, and transmitting data between hardware components. For example, a device driver program 312-1, 312-2, ..., 312-N can allocate or de-allocate a transmit device and/or a receive device.

The operating system 310 includes a mobile operating system or a real-time operating system. As noted above, the LMR processor 250 of FIG. 2 is built on a real-time operating system. In contrast, the cellular processor 252 of FIG. 2 is built on the mobile operating system. The operating system 310 is generally configured for the direct control and management of the hybrid unit 106 hardware of FIG. 2. Typically, the operating system 310 manages basic processing operations, such as loading and running software applications. The operating system may also be responsible for: transforming data structures to network defined structures, such as byte sequences, for transmission over a network; enabling system switching between software programs and tracing the location of software programs; and enabling a user to control hardware coupled to the hybrid unit 106. The operating system can also include instructions to install, launch, and manage applications. The operating system is typically stored in memory 214 and/or 216 of FIG. 2, which may be a ROM, hard drive or other storage device.

The platform devices and services 308 enable software components written in multiple computer languages to work together. The platform devices and services 308 can include a display configuration provider (not shown), a communications provider (not shown), and other providers/services known in the art. The display configuration provider (not shown) is software responsible for the direct control and management of display configurations. Display configurations are well known to those having ordinary skill in the art, and therefore will not be described herein.

The software applications 302, 304, 306 include programs designed for end users, such as communication programs ("waveforms") and database programs. For example, in the LMR processor scenario, the software application 302 is a radio channel control program, a waveform control program, and/or a communications application. The radio channel control program can include instructions for selecting a radio channel and configuring radio devices for enabling a user to listen to radio broadcasts. The waveform control program can include instructions for enabling a signal transmission by defining a frequency bandwidth, modulation, encryption, and/or decryption. The communication application includes instructions for frequency selection, modulation and/or demodulation. The communication application can be hardware entity independent. For example, the communication application can include instructions for communicating with a number of hardware entities for performing frequency selection, modulation, and/or demodulation. The software applications 302, 304, 306 are installed on the hybrid unit 106.

A person skilled in the art will appreciate that the software architecture 300 illustrates an embodiment of a software architecture in which the methods described below can be implemented. The invention is not limited in this regard and any other software architecture specified by a radio or cellular communication architecture may be used without limitation.

Figure 4:
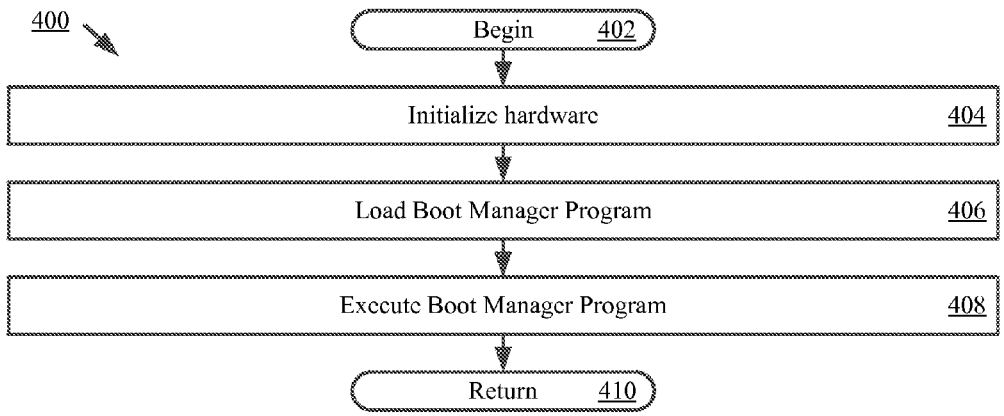
FIG. 4 is a flowchart of a software routine for booting the hybrid unit showing FIGS. 1-2.

FIG. 4 is a flowchart of a boot software routine 400 for a hybrid unit (e.g., hybrid unit 106 or 108 of FIG. 1). Boot software contains a defined routine for getting the hybrid unit fully operational (i.e., up and running). The boot software routine 400 provides certain functionalities (e.g., critical LMR communication capabilities) to a user almost instantaneously by simultaneously booting LMR software programs and cellular software programs. The LMR software programs boot in a relatively small amount of time (e.g., 3 seconds) as compared to the cellular software programs which boot in a relatively large amount of time (e.g., >15 seconds).

As shown in FIG. 4, the boot software routine 400 begins at 402 and continues with 404. In step 404, the hybrid unit's hardware (e.g., the hardware of FIG. 2) is initialized in a conventional manner. This step can involve loading a boot infrastructure into a memory (e.g., memory 214 and/or 216 of FIG. 2) and subsequently executing the boot infrastructure. A boot infrastructure is well known to persons skilled in the art. Thus, a boot infrastructure will not be described in detail herein. Still, it should be understood that a boot infrastructure includes code to apply power to hardware and to configure hardware needed to load and execute a boot program. Once the hardware is initialized, a boot manager program is loaded into memory as shown by step 406. After loading the boot manager program into memory, the boot software routine 400 continues with step 408. In step 408, the boot manager program is executed. Next, step 410 is performed where the boot software routine 400 returns to step 402.

Boot manager programs are well known to persons skilled in the art. Thus, boot manager programs will not be described in detail herein. The boot manager program coordinates the boot process such that software programs can be loaded in a given order. A person skilled in the art will appreciate that a boot manager is one embodiment of a program for enabling a boot of a hybrid unit. The invention is not limited in this regard, and any other boot program (e.g., a dual boot utility program) can be used without limitation.

Figure 5:
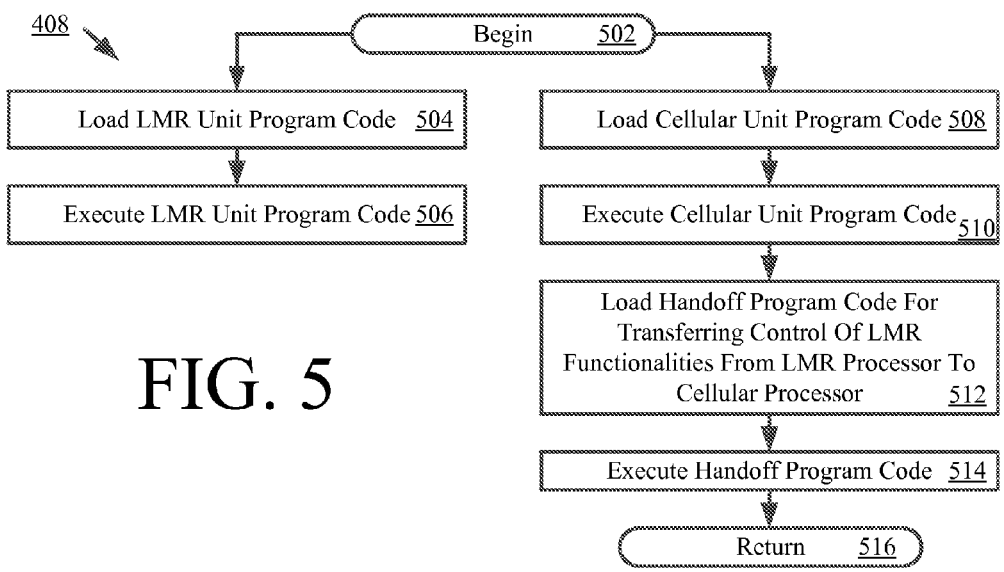
FIG. 5 is a flowchart of a software routine for the execute boot manager program step of FIG. 4.

FIG. 5 is a flowchart of a software routine for the execute boot manager program step 408 of FIG. 4. The software routine begins at 502 and continues with steps 504-506 and steps 508-516. Steps 504-506 are performed to provides critical LMR communication capabilities to a user almost instantaneously upon power up or a re-boot of a hybrid unit (e.g., hybrid unit 106 or 108 of FIG. 1). The critical LMR communication capabilities include, but are not limited to, radio communications with individual remote radios or a group of remote radios associated with members of a talkgroup. The critical LMR communication capabilities will become more evident as the discussion progresses. Accordingly, step 504 involves loading an LMR unit program code into memory (e.g., memory 214 of FIG. 2). Step 506 involves executing the LMR unit program code. As a consequence of executing the LMR unit program code a real-time operating system is loaded and executed by an LMR processor (e.g., LMR processor 250 of FIG. 2).

In contrast, steps 508-516 are performed to get the hybrid unit fully operational. As such, step 508 involves loading a cellular unit program code into memory (e.g., memory 216 of FIG. 2). Step 510 involves executing the cellular unit program code. As a result of executing the cellular unit program code, a mobile operating system is loaded into memory and executed by a cellular processor (e.g., cellular processor 252 of FIG. 2). Thereafter, handoff program code is loaded into memory (e.g., memory 214 and/or 216 of FIG. 2). The handoff program code is generally operative to transfer control of the critical LMR functionalities from an LMR processor (e.g., LMR processor 250 of FIG. 2) to a cellular processor (e.g., cellular processor 252 of FIG. 2). The handoff program code is then executed in step 514. Upon completing step 514, the software routine returns to step 502.

Figure 6:
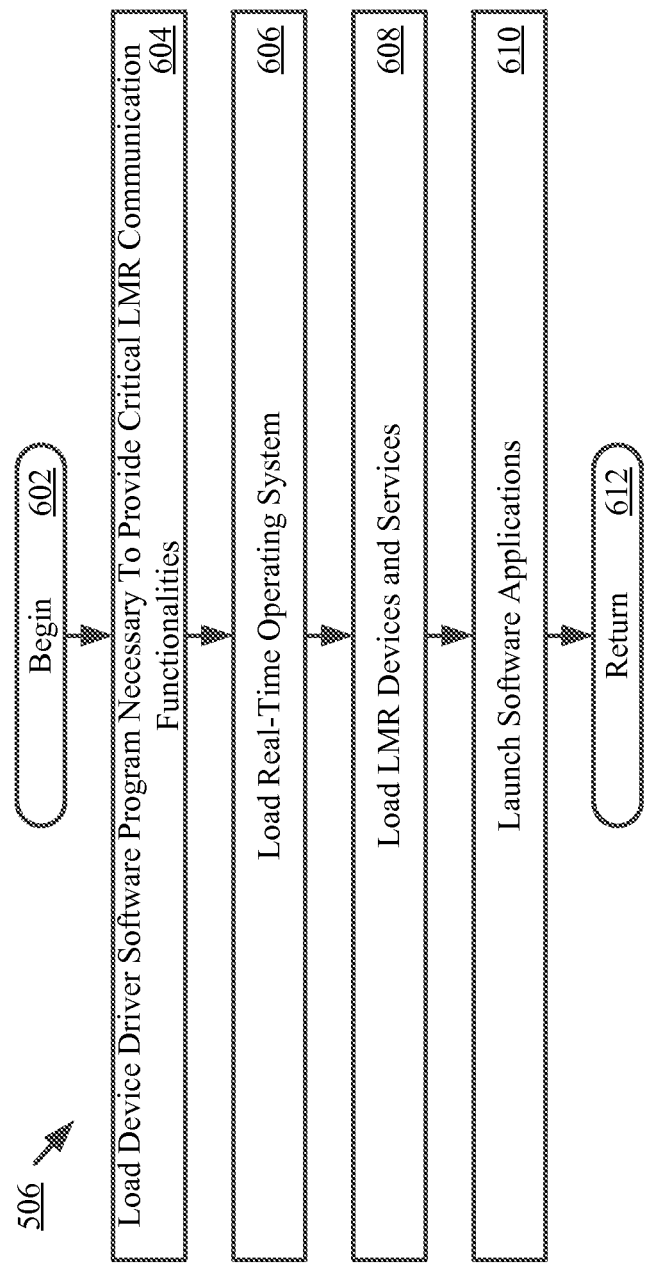
FIG. 6 is a flowchart of a software routine for the execute LMR unit program code step of FIG. 5.

FIG. 6 is a flowchart of a software routine for the execute LMR unit program code 506 of FIG. 5. The software routine begins at step 602 and continues with steps 604. Step 604 involves loading device driver software programs (e.g., device driver software programs 312-1, 312-2, . . . , 312-N of FIG. 3) into a memory (e.g., memory 214 of FIG. 2) of an LMR processor (e.g., LMR processor 250 of FIG. 2). The device driver software programs can include control code for a pre-defined transceiver (e.g., transceiver 206 of FIG. 2), a pre-defined antenna (e.g., antenna 202 of FIG. 2), and a pre-defined frequency synthesizer (not shown).

Figure 7:
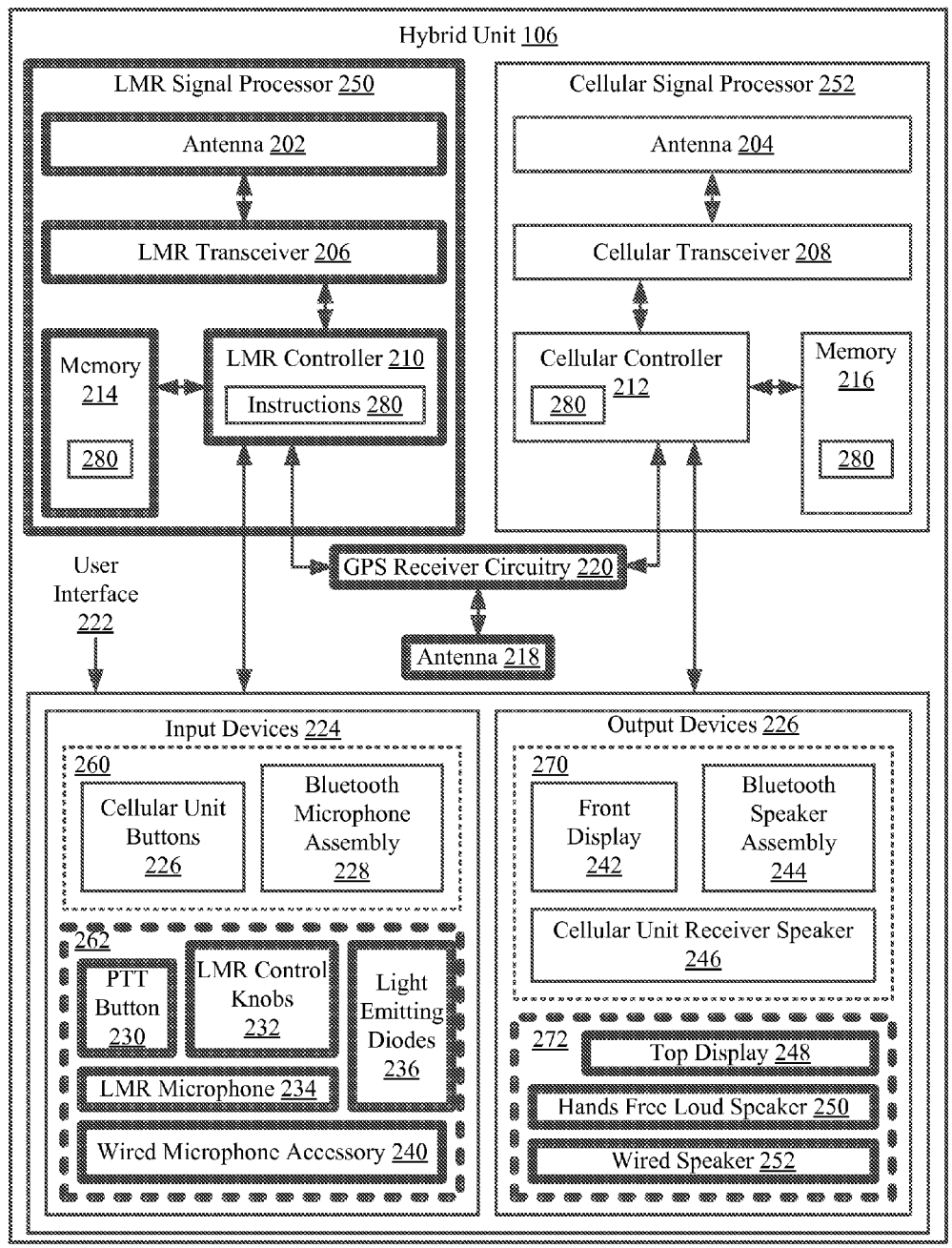
FIG. 7 is a schematic illustration showing the hardware that is available after the software routine of FIG. 6 has been performed.

In a next step 606, a real-time operating system is loaded into the memory of the LMR processor. Notably, the real-time operating system is a separate operating system than that loaded in step 510 of FIG. 5. Once the real-time operating system is loaded into memory, LMR software programs and LMR service software programs (e.g., platform devices and services 308 of FIG. 3) are loaded into the memory, as shown by step 608. The LMR software programs can include instructions for controlling hardware of an LMR processor (e.g., LMR processor 250 of FIG. 2), first stage input devices (e.g., first stage input devices 262 of FIG. 2), and/or first stage output devices (e.g., first stage output devices 272 of FIG. 2). FIG. 7 provides a schematic illustration that visually highlights, via relatively thick black lines, which hardware of a hybrid unit is controlled by such LMR software programs. The LMR services software programs can include instructions for providing services such as encryption, decryption, and fault management. After the LMR device/service software programs are loaded into memory, at least one installed application is launched in step 610 which facilitates the provisions of critical LMR functionalities. In this regard, the installed application can include a software program for channel control and waveform configuration. In step 612, the software routine 506 returns to step 602.

Figure 8:
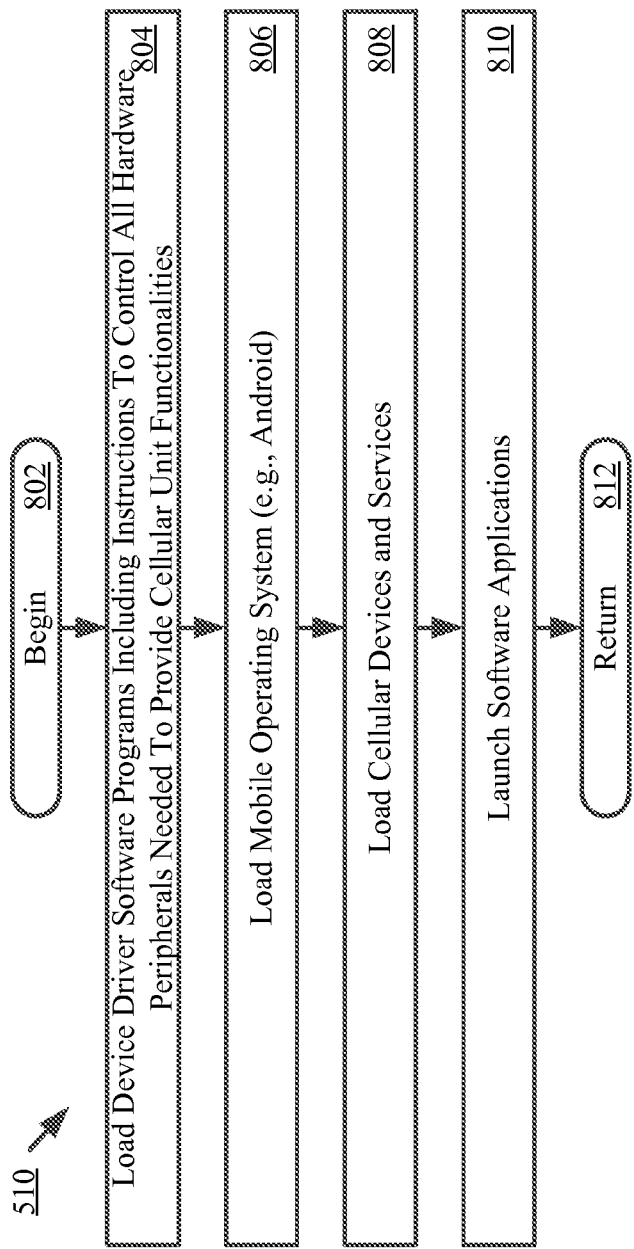
FIG. 8 is a flowchart of a software routine for the execute cellular unit program code step of FIG. 5.

FIG. 8 is a flowchart of a software routine for the execute cellular unit program code step 510 of FIG. 5. The software routine begins at step 802 and continues with steps 804. Step 804 involves loading device driver software programs (e.g., device driver software programs 312-1, 312-2, . . . , 312-N of FIG. 3) into a memory (e.g., memory 216 of FIG. 2) of a cellular processor (e.g., LMR processor 252 of FIG. 2). The device driver software programs can include control code for a pre-defined transceiver (e.g., transceiver 208 of FIG. 2) and a pre-defined antenna (e.g., antenna 204 of FIG. 2).

Figure 9:
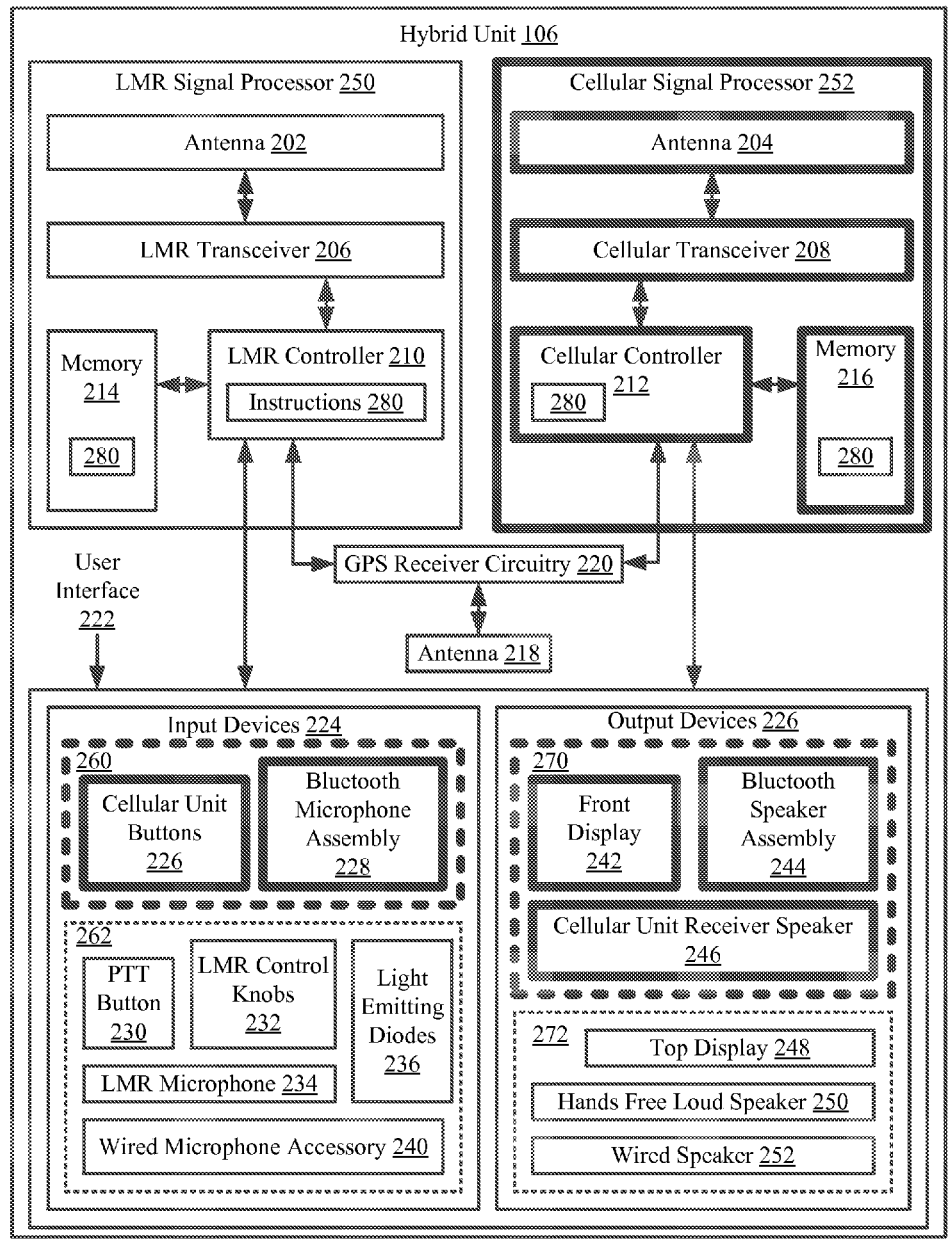
FIG. 9 is a schematic illustration showing the additional hardware that is available after the software routine of FIG. 8 has been performed.

In a next step 606, a mobile operating system is loaded into the memory of the cellular processor. Notably, the mobile operating system is a separate operating system than that loaded in step 606 of FIG. 6. Once the mobile operating system is loaded into memory, cellular software programs and cellular service software programs (e.g., platform devices and services 308 of FIG. 3) are loaded into the memory, as shown by step 808. The cellular software programs can include instructions for controlling hardware of a cellular processor (e.g., cellular processor 252 of FIG. 2), second stage input devices (e.g., second stage input devices 260 of FIG. 2), second stage output devices (e.g., first stage output devices 270 of FIG. 2) and/or GPS equipment (e.g., GPS components 218, 220 of FIG. 2). FIG. 9 provides a schematic illustration that visually highlights, via relatively thick black lines, which hardware of a hybrid unit is controlled by such cellular software programs. The cellular services software programs can include instructions for providing services such as encryption, decryption, and fault management. After the cellular device/service software programs are loaded into memory, at least one installed application is launched in step 810 which facilitates the provisions of cellular communication functionalities, personal digital assistant functionalities, portable media player functionalities, digital camera functionalities, video camera functionalities, location tracking functionalities, web browser functionalities, and touch screen functionalities. In step 812, the software routine 510 returns to step 802.

Notably, the software routine of FIG. 8 can include more or less steps than that shown. For example, in some scenarios, the software routine of FIG. 8 can include a step in which a boot status is displayed on a front display (e.g., front display 242 of FIG. 2) through out at least a portion of the time it takes to get at least the cellular processor (e.g., cellular processor 252) fully operational. The software routine of FIG. 8 can also include a step in which a PTT service loads and an LMR radio status is displayed on the front display. These additional steps can be performed prior to any handoff operations (e.g., steps 512-514 of FIG. 5).

Figure 10:
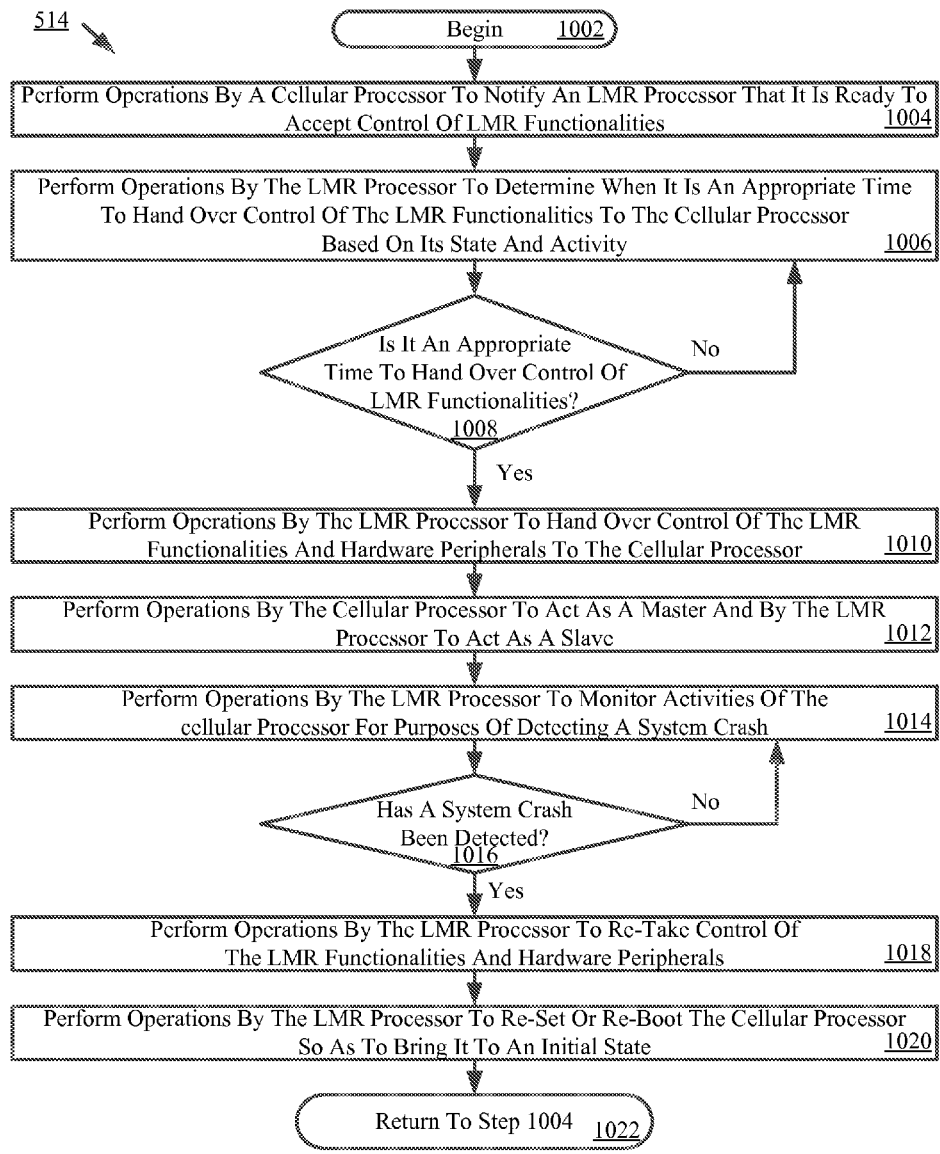
FIG. 10 is a flowchart of a software routine for the execute handoff program code step of FIG. 5.

FIG. 10 is a flowchart of a software routine for the execute handoff program code step 514 of FIG. 5. The software routine begins at step 1002 and continues with steps 1004. Step 1004 involves performing operations by a cellular processor (e.g., cellular processor 252 of FIG. 2) to notify an LMR processor (e.g., LMR processor 250 of FIG. 2) that it is ready to accept control of critical LMR functionalities. In response to such a notification, the LMR processor performs operations in step 1006 to determine when it is an appropriate time to hand over control of the LMR functionalities to the cellular processor. The criteria on which this determination is made can be pre-defined or customized by a user of the hybrid unit. In some scenarios, this determination is based on the operating state of the LMR processor and the activity of the LMR processor. For example, if the LMR processor is currently handing a talkgroup call, then it may decide that now is not an appropriate time to hand over control of the LMR functionalities. If a determination is made that it is not an appropriate time to hand over control of the LMR functionalities [1008: NO], then the software routine returns to step 1006. In contrast, a determination can be made that now is an appropriate time to hand over control of the LMR functionalities when the LMR processor is not performing any LMR communication operations. If such a determination is made that it is an appropriate time to hand over control of the LMR functionalities [1008:YES], then the software routine continues with step 1010 where control of the LMR functionalities are handed over to the cellular processor. As a consequence of this hand over, the cellular processor acts as a master processor and the LMR processor acts as a slave processor, as shown by step 1012.

As a slave processor, the LMR processor monitors activities of the cellular processor for purposes of detecting a system crash, as shown by step 1014. If a system crash has not been detected [1016:NO], then the software routine returns to step 1014. If a system crash has been detected [1016:YES], then the LMR processor re-takes control in step 1018 over the LMR functionalities and hardware peripherals. The LMR processor also re-sets or re-boots the cellular processor so as to bring it to an initial state, as shown by step 1020. Upon completing step 1020, step 1022 is performed where the software routine returns to step 1004.

In view of the forgoing, the present invention provides a hybrid unit in which a seamless merging of critical hardware availability occurs with a full featured mobile operating system. Also, the hybrid unit is able to rapidly and automatically recover from any system crash. As such, the hybrid unit overcome various drawbacks of conventional LMR radios and conventional cellular phones (e.g., Smartphones).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for operating a hybrid communication device, comprising:
   executing at least one boot program;
   responsive to the boot program, concurrently executing a first code for booting at least a real-time operating system on which a radio processor of the hybrid communication device is built and a second code for booting at least a mobile operating system on which a cellular processor of the hybrid communication device is built; and
   providing with the radio processor support for wireless radio communication functionalities while the mobile operating system is booting.

2. The method according to claim 1, further comprising controlling by the radio processor only a first portion of a plurality of input and output devices of the hybrid communication device that are necessary for providing the wireless radio communication functionalities, while the mobile operating system is booting.

3. The method according to claim 1, further comprising executing a third code for transferring control of the first portion of the input and output devices from the radio processor to the cellular processor, after the mobile operating system has fully booted.

4. The method according to claim 1, further comprising executing a third code for transferring control of the wireless radio communication functionalities from the radio processor to the cellular processor, after the mobile operating system has fully booted.

5. The method according to claim 4, further comprising performing operations by the cellular processor to notify the radio processor that it is ready to accept control of the wireless radio communication functionalities.

6. The method according to claim 5, further comprising performing operations by the radio processor to determine when to transfer control of the wireless radio communication functionalities to the cellular processor based on a pre-defined criteria.

7. The method according to claim 6, wherein the pre-defined criteria comprises an operating state of the radio processor and a current activity of the radio processor.

8. The method according to claim 4, further comprising monitoring, by the radio processor, activities of the cellular processor to detect a system crash.

9. The method according to claim 8, further comprising performing operations by the radio processor to re-take control of the wireless radio communication functionalities when a system crash is detected.

10. The method according to claim 8, further comprising performing operations by the radio processor to re-set the cellular processor so as to bring it to an initial state, when a system crash is detected.

11. A hybrid communication device, comprising:
a radio processor configured to provide wireless radio communication functionalities;
a cellular processor configured to provide cellular communication functionalities; and
at least one electronic circuit configured to concurrently execute a first code for booting at least a real-time operating system on which the radio processor is built and a second code for booting at least a mobile operating system on which the cellular processor is built;
wherein the radio processor provides support for the wireless radio communication functionalities while the mobile operating system is booting.

12. The hybrid communication device according to claim 11, wherein the radio processor is further configured to control only a first portion of a plurality of input and output devices of the hybrid communication device that are necessary for providing the wireless radio communication functionalities, while the mobile operating system is booting.

13. The hybrid communication device according to claim 11, wherein the electronic circuit is further configured to execute a third code for transferring control of the first portion of the input and output devices from the radio processor to the cellular processor, after the mobile operating system has fully booted.

14. The hybrid communication device according to claim 11, wherein the electronic circuit is further configured to execute a third code for transferring control of the wireless radio communication functionalities from the radio processor to the cellular processor, after the mobile operating system has fully booted.

15. The hybrid communication device according to claim 14, wherein the cellular processor is configured to notify the radio processor when it is ready to accept control of the wireless radio communication functionalities.

16. The hybrid communication device according to claim 15, wherein the radio processor is configured to determine when to transfer control of the wireless radio communication functionalities to the cellular processor based on a pre-defined criteria.

17. The hybrid communication device according to claim 16, wherein the pre-defined criteria comprises an operating state of the radio processor and a current activity of the radio processor.

18. The hybrid communication device according to claim 14, wherein the radio processor is further configured to monitor activities of the cellular processor to detect a system crash.

19. The hybrid communication device according to claim 18, wherein the radio processor is configured to re-take control of the wireless radio communication functionalities when a system crash is detected.

20. The hybrid communication device according to claim 18, wherein the radio processor is configured to re-set the cellular processor so as to bring it to an initial state, when a system crash is detected.

* * * * *